Nov. 7, 1967 R. L. MUCCI ET AL 3,350,919
TESTING APPARATUS
Filed July 24, 1964 5 Sheets-Sheet 1

INVENTORS
Arthur Y. Anderson
Ralph L. Mucci
By Frederick J. Kube
Atty.

Nov. 7, 1967 — R. L. MUCCI ET AL — 3,350,919
TESTING APPARATUS
Filed July 24, 1964 — 5 Sheets-Sheet 2

INVENTORS
Arthur Y. Anderson
Ralph L. Mucci
By Frederick J. Kube
Atty.

United States Patent Office 3,350,919
Patented Nov. 7, 1967

3,350,919
TESTING APPARATUS
Ralph L. Mucci, Elmhurst, and Arthur Y. Anderson, Cicero, Ill., assignors to John R. Nalbach Engineering Co., Chicago, Ill., a corporation of Illinois
Filed July 24, 1964, Ser. No. 384,949
6 Claims. (Cl. 73—41.2)

This invention relates to a testing apparatus and, more particularly, to a new and improved machine for testing sealed receptacles or containers, such as aerosol dispensers or bombs, charged with a pressure propellent for leakage.

A multitude of different kinds of liquid products, such as soap solutions, paints, insecticides, deodorants, etc. are presently being marketed in hermetically-sealed self-dispensing containers commonly called aerosol bombs. The liquid product disposed within the container is expelled therefrom by pressure created by a propellent gas which is generally in the form of a liquified-gas or volitile liquid solution having a relatively low heat of vaporization or a compressed gas.

The container usually includes a cylindrical body closed at its bottom end and having an upper neck portion provided with a central circular filling opening which is defined by an outwardly-rolled annular bead, the outer surface of which serves as a seat for a closure cap. The container body is generally made of metal such as tin plate, steel or aluminum but can be made of non-metallic materials such as plastics. In the manufacture of aerosol dispensers, subsequent to the operational step wherein the cylindrical body is filled with a predetermined quantity of the product to be dispensed, the closure cap, which has a valve device incorporated therein to control dispensing the product is sealed to the outwardly-rolled annular bead defining a filling opening in a gas-tight manner. The propellent is added to the container body before the closure cap is fixed thereto, or during the cap securing operation, or through the closure cap valve device after the closure cap is secured to the container body.

The final step in the manufacturing and processing of pressurized containers, prior to the shipping thereof to the market, is concerned with the testing of the containers for leakage. Obviously, leakage can occur at the seams of the container body because of defects resulting in the faulty fabrication thereof, around the annular juncture of the closure cap and container body if the closure cap is improperly sealed and/or seated on the annular bead defining the filling opening, and through the dispensing valve device if valve device itself is defective. It is essential that the filled, sealed containers be leak-proof and entirely free of any holes, cracks or the like or any weaknesses or imperfections which could possibly develop into leak holes, cracks or the like if the container is subjected to elevated temperatures. Thus, certain standards have been established by the Federal Government and the pressure-dispensing packaging industry setting forth the minimum structural requirements of such pressurized containers and the testing procedure for checking the structural requirements of the containers which requires the heating of each filled container to a particular temperature in order to raise the pressure within the container without the container showing any evidence of leakage.

The leakage testing is usually accomplished by submerging each container in a tank of heated water to elevate the internal pressure of the container. The container is observed during such submergence and leakage is indicated by bubbles rising to the surface of the liquid in the test tank. Obviously, because of the construction of the container and the density of the contents thereof, there is a tendency for the container to float on the surface of the liquid in the test tank when placed therein. Heretofore, certain prior leakage testing apparatuses involved the use of a submerged screen or grid, beneath which the container passed, for maintaining the containers submerged and preventing them from rising to the surface of the testing tank liquid. The screen or grid impairs observation of any leakage bubbles and hampers the testing operation. Other leakage testing apparatuses employed a submerged conveying device fitted with a magnetic mounting plate for receiving a container. The apparatuses were designed so that the force exerted by the mounting plates on the container exceeded the force of buoyancy acting on the container. Obviously, a serious shortcoming of the latter type of leakage testing apparatuses is its inability to handle containers made of non-magnetic materials such as aluminum or the like. Furthermore, both types of leakage testing apparatuses are generally designed to only handle containers of a particular size and, thus, use of the apparatuses is limited. It is, therefore, a primary objective of the present invention to provide a simple, highly effective leakage testing apparatus which obviates the shortcomings of prior leakage testing apparatuses and which is capable of continuously carrying containers under internal gas pressure through a tank containing a liquid whereby observers stationed at the tank can easily ascertain whether the containers are leaking by observing gas bubbles rising therefrom in the liquid.

An important object of the invention is to provide means for handling and testing containers, receptacles, etc. after they have been hermetically sealed or capped to determine if the container including any closure cap is gas-tight.

A more specific object is to provide a leakage testing apparatus of the character described above which is capable of accommodating containers of a variety of sizes without modification of the apparatus and which can be used in conjunction with containers made of any kind of material regardless if the material is magnetic or not.

A further object is to provide a unique conveyor means which includes runs traversing the test tank below the liquid level and which is equipped with a plurality of novel gripping devices for releasably clamping containers thereto for movement therewith below the liquid level.

A still further object is to provide a liquid-filled test tank and a conveyor extending through the liquid, the conveyor having gripping means for engaging the containers being tested and for holding the containers under the surface of the liquid in the tank, means for continuously delivering containers to the conveyor and causing the gripping means to engage the container, and means for automatically releasing the gripping means to disengage the container from the conveyor at the discharge end thereof and for transferring them to a delivery conveyor.

Another object is the provision of a gripping mechanism for a conveyor which is capable of clamping a cylindrical container at three points so that the container will move with the conveyor and which gripping mechanism can clamp container bodies of varying diameter and without marring or damaging the container.

Still another object is to provide a leakage test apparatus of the character described which is substantially automatic in operation and lends itself readily to the mass or quantity production of aerosol dispensers or the like.

The foregoing and other important objects and desirable features inherent in and encompassed by the invention, together with many of the purposes and uses thereof, will become readily apparent from a reading of the ensuing description in conjunction with the annexed drawings, in which.

Referring to the drawings in detail, wherein like reference characters represent like elements throughout the various views, the invention as shown embodies in an apparatus, designated generally by reference character 10, for handling and testing hermetically-sealed self-dispensing containers of the aerosol bomb type for leakage. It is to be understood, however, that the apparatus 10 is equally capable for use in handling and testing sealed containers such as glass and plastic bottles and the like having a positive internal pressure other than aerosol dispensers. Furthermore, the manner in which the interior of the container is subjected to a positive pressure whether it be by the charging of the container with a compressed gas, by introducing a liquified-gas or volatile liquid solution having a relatively low heat of vaporization, or by other means is immaterial as far as the invention is concerned. The term container is therefore herein employed in a broad sense as indicating any sealed vessel, receptacle or bottle.

In accordance with the preferred manufacture and processing of containers such as aesosol bombs or the like, the required quantity of the product to be dispensed from the container in use is placed in the container body which is preformed or fabricated. The pressure propellent is either introduced into the container body simultaneously with the product, or during the sealing operation when the container body is fitted with a closure cap, or after the closure cap has been secured to the container body. All the several operations are performed automatically or semi-automatically with the containers passing through the filling and capping machines in a continuous procession, while being transferred between the machines on traveling belts, chains or other conveyors. Because of defects in the preforming of the container body, and/or because the capping machine fails to properly seal the closure cap to the container body in a gas-tight manner for one reason or another and/or because of defects present in the valve device of the closure cap, the container is not gas-tight and thus should be rejected. It is the usual practice to test the containers by immersing them in water to detect any leakage of gas bubbles issuing therefrom. The apparatus 10 of the present invention is capable of handling the containers automatically and is well adapted to the other automatic or semi-automatic operational phases or steps of the generally accepted methods for manufacturing and processing containers of the self-dispensing type.

The test apparatus 10 includes a supporting framework 11 fabricated from various conventional milled-rolled stock pieces such as angle iron and the like. The supporting framework 11 may be of any suitable length and width and includes a plurality of upright standards or legs 12, each of which is provided with a vertically adjustable floor-engaging foot 13 whereby the apparatus 10 may be readily leveled and the height thereof off the floor may be adjusted. The supporting framework 11 serves as a base upon which the liquid-containing test tank, designated generally by reference character 15 and the various operating parts of the apparatus 10 are carried.

Figure 1:
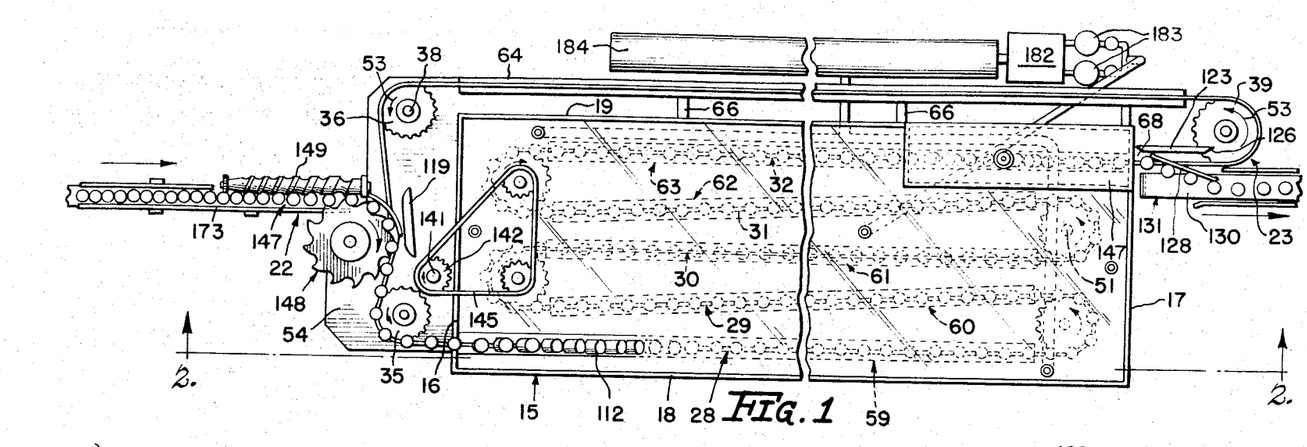
FIGURE 1 is a top plan view of a leakage testing apparatus constructed in accordance with the invention.

The test tank 15 is illustrated herein as being fabricated of sheet material and has a generally rectangular shape in plan as well as in side elevation. The longitudinally spaced vertical end walls 16, 17 are connected to the transversely spaced, vertical side walls 18, 19 and the end and side walls, in turn, are suitably joined to a bottom wall 20. The test tank 15 is fixedly connected to the framework 11, and, as best shown in FIGURE 1, has an open top. The test tank 15 is preferably made of rust proof material such as stainless steel or the like or has its interior surfaces coated or treated so as to be rust resistant.

Essentially, in addition to the liquid-containing test tank 15, the apparatus 10 includes conveyor means 21 for moving the containers being tested through the test tank 15, means, designated generally by reference character 22, for feeding containers to the conveyor means 21, and container discharge means 23. Additionally the basic apparatus 10 includes means 24 for heating the test bath water and circulating the heated water through the test tank 15, power means 25 including power transmission means for driving the container feeding means 22, conveyor means 21, and the discharge means 23, and container drying means designated generally by reference character 26, for subjecting the containers to air streams in order to dry the containers after they pass through the test tank water.

Figure 2:
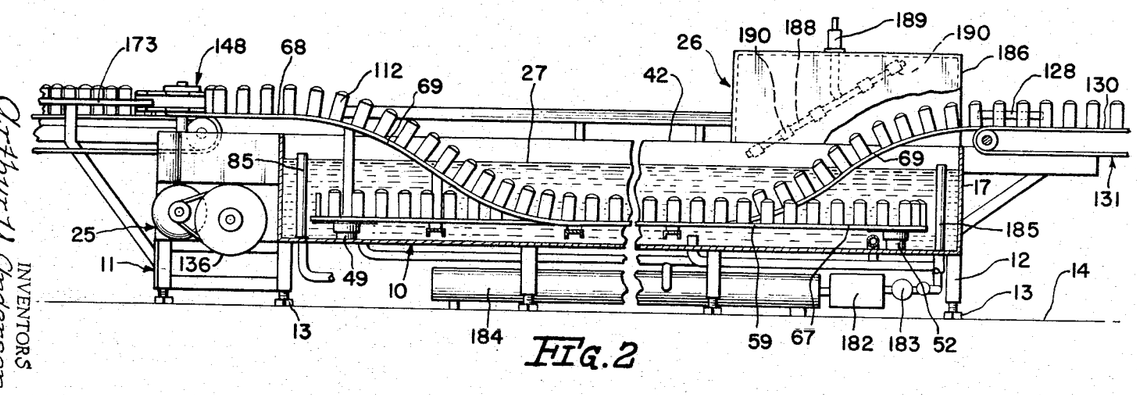
FIGURE 2 is a vertical sectional view taken substantially along line 2—2 of FIGURE 1.
Figure 3:
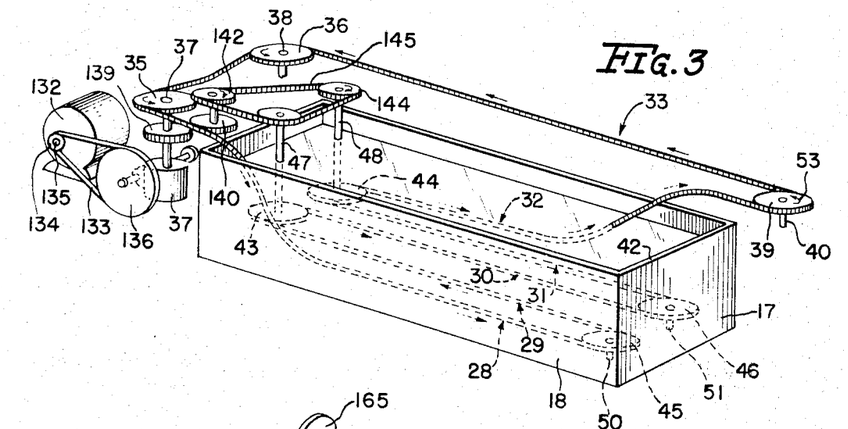
FIGURE 3 is a somewhat diagrammatic, perspective view of that portion of the power transmission means for driving the conveyor.
Figure 4:
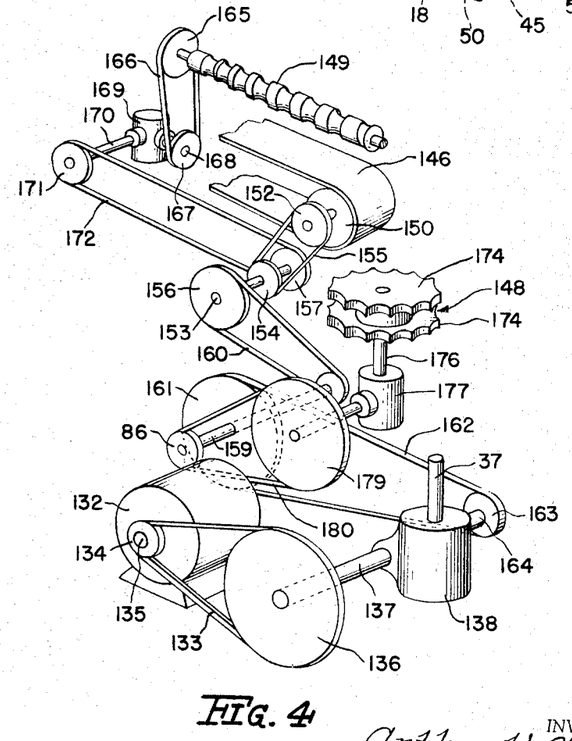
FIGURE 4 is a view similar to FIGURE 3 illustrating that portion of the power transmission mechanism for driving the means for feeding containers to the conveyor.

Referring to FIGURES 1 and 2, where in the general arrangement of the conveyor means 21 for supporting and moving the containers through the water, the upper level of which is indicated by reference character 27, contained in the test tank, is best illustrated, it will be noted that the conveyor means 21 is arranged so as to provide six transversely spaced, longitudinally extending conveyor runs 28 to 33, inclusive, is believed apparent. The overall length of the test tank 15 can be reduced and, hence, the test tank 15 can be made more compact by providing multiple conveyor runs. The conveyor runs 29, 30 and 31 are completely submerged in the test tank water, the conveyor run 33 is completely above the water level 27 and the remaining conveyor runs, namely, 28 and 32 are each above and below the water level 27, as best illustrated in FIGURE 2.

The conveyor means 21 includes an endless roller type conveyor chain 34. The conveyor chain 34 is trained over a pair of transversely spaced sprocket wheels 35 and 36 which are fixed to vertical shafts 37 and 38, respectively, disposed without the test tank 15 adjacent the end wall 16 thereof. The conveyor chain 34 is also trained about a third sprocket wheel 39, keyed to a vertical shaft 40 suitable journaled in an extension, designated generally by reference character 41, which extension 41 projects longitudinally from and is rigidly secured to the test tank 15 at the end wall 17 thereof. The sprocket wheels 35, 36 and 39 all lie substantially in a common horizontal plane spaced vertically above the upper marginal edge 42 of the test tank 15. The conveyor chain 34 is also trained over four sprocket wheels 43, 44, 45 and 46 which are normally disposed below the level 27 of the water in the test tank 15 when the apparatus 10 is in operation. The sprocket wheels 43, 44 are rotatably secured to transversely spaced and aligned vertical shafts 47 and 48, respectively. The lowermost ends of the shafts 47, 48 are suitably journaled in bearing blocks 49 (only one of which is shown in FIGURE 2) mounted on the bottom 20 of the test tank 15. The sprocket wheels 45 and 46 are transversely spaced and aligned with respect to each other and are longitudinally spaced from the sprocket wheels 43 and 44. The sprocket wheels 45 and 46 are keyed to the ends of vertical stub shafts 50 and 51, respectively, which, in turn, are rotatably supported in bearing blocks 52 (one of which is illustrated in FIGURE 2) mounted on the bottom 20 of the test tank 15. It is to be understood that suitable means (not shown) could be provided for adjusting the longitudinal spacing between the bearing blocks 52 and 49 so as to regulate the tension of the conveyor chain 34. It is to be understood that all of the sprocket wheels 35, 36, 39, 43, 44, 45 and 36 have the same pitch diameter and rotate in the direction of the arrows 53 when the apparatus 10 is in operation. The sprocket wheel 35 constitutes the drive sprocket wheel of the conveyor means 21 and the manner in which it is driven will be explained hereinafter when the power means 25 is described in detail.

Figures 5, 6:
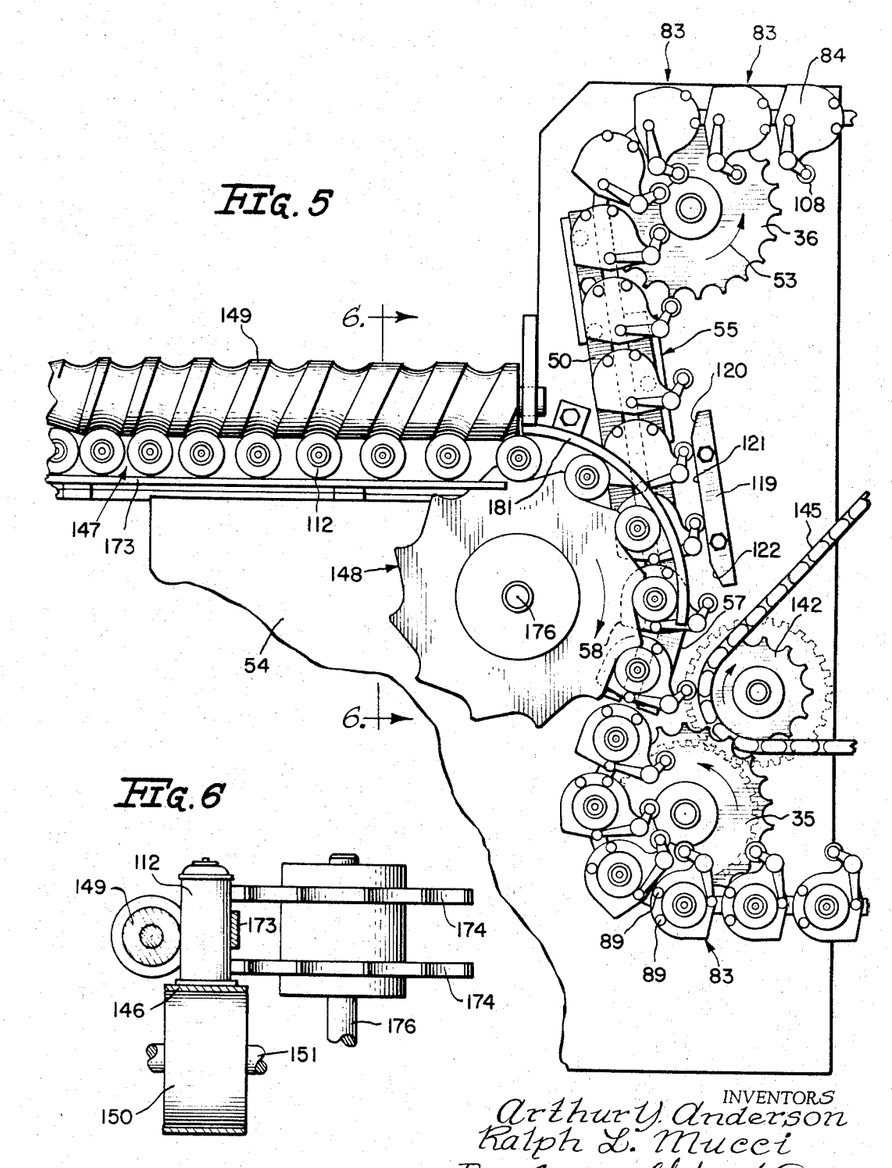
FIGURE 5 is an enlarged top plan view of the container-receiving end of the test tank, showing the means for delivering containers to the conveyor means and for controlling the operation of the container carriers.
FIGURE 6 is a vertical sectional view taken substantially along line 6—6 of FIGURE 5.

Projecting longitudinally from and fixed with respect to the end wall 16 of the test tank 15, adjacent the uppermost marginal edge 42 thereof, is a horizontally disposed platform 54. As best shown in FIGURES 1 and 5, the sprocket wheels 35 and 36 are disposed above the platform 54 and the generally transversely extending conveyor run extending between the sprocket wheels 35 and 36 passes through a track or rail conveyor guide designated generally by reference character 55, mounted on the top surface of the platform 54. When viewed in plan, the track rail means 55 is shaped to provide a relatively long straight section 56, a short straight section 57 and a curved section 58 at the merger of the long and straight sections 56, 57. The detailed construction of the track rail 55 and the manner in which it supports and guides the conveyor chain 34 will be pointed out presently. In addition to the track rail 55 mounted on the platform 54, the apparatus 10 is provided with track rails or conveyor guides 59, 60, 61, 62, 63 and 64 which support and guide the conveyor runs 28, 29, 30, 31, 32 and 33, respectively.

The track rails 61, 62 and 63 lie substantially in a common horizontal plane and are the same length. The track rail 64 also lies substantially in a horizontal plane which is vertically spaced above the uppermost marginal edge 42 of the test tank 15. The track rail 64 extends longitudinally from the platform 54 and has its opposite end portion overlying the uppermost flat surface 65 of the extension 41 extending longitudinally from the test tank 15. The track rail 64 is supported along the outer side of the side wall 19 of the test tank 15 by means of a plurality of longitudinally spaced, horizontally disposed outriggers 66, made of angle iron or the like, which have their innermost ends rigidly secured, as by welding or the like, to the side of the test tank 15.

The track rails 59 and 63 have similar shapes when viewed in side elevation. Each has a horizontal section 67 lying in the common plane containing the track rails 60, 61 and 62, a relatively short horizontal section 68 lying in the horizontal plane containing the track rail 64 and is formed with an inclined section 69 joining respective ends of the horizontal sections 67 and 68 thereof together.

Figure 9:
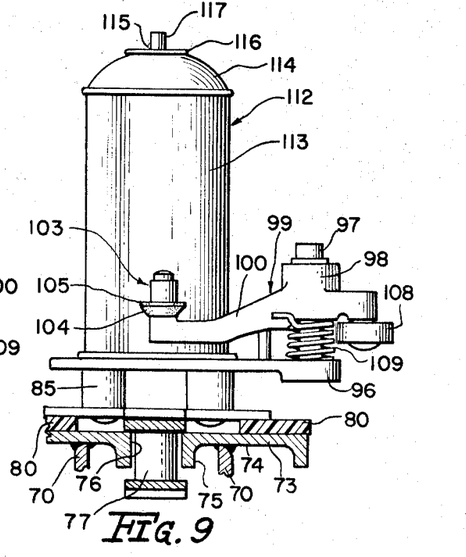
FIGURE 9 is a vertical sectional view taken substantially along line 9—9 of FIGURE 7.
Figure 11:
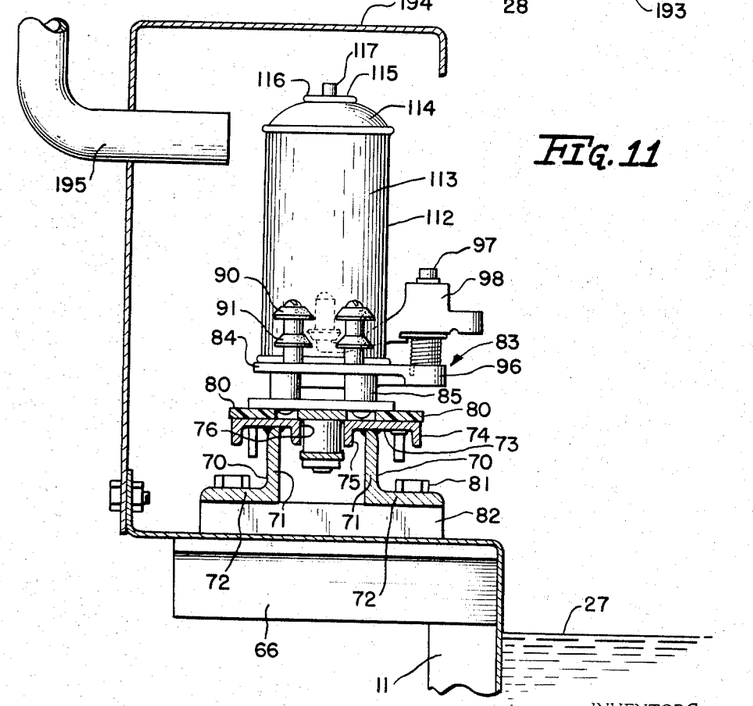
FIGURE 11 is a vertical cross sectional view taken substantially along line 11—11 of FIGURE 10.

All of the track rails 55 and 59 to 64, inclusive, are constructed substantially in the same manner. Referring to FIGURES 9 and 11 wherein the constructional details of the track rails are best illustrated, each track rail 55 and 59 to 64, inclusive, includes a plurality of spaced support brackets. Each bracket includes a pair of members 70, each of which has an L-shaped cross sectional shape. A leg 71 of each member 70 is arranged so as to be vertically disposed. The legs 71 are spaced and parallel with respect to each other when the track rails are assembled with the other leg 72 of each member 70 extending normally outwardly from the leg 71. The web portion 73 of an inverted, substantially U-shaped channel member 74 is rigidly secured, as by welding, to the uppermost marginal edge of each vertically disposed leg 71 of each of the members 70. The bracket members 70 are spaced along the length of the channel members 74. From the foregoing, it will be appreciated that the innermost flange 75 of each channel member 74 is vertically disposed and is spaced from the flange 75 of a respective adjacent channel member 74. Thus, the inwardly facing surfaces 76 of the flanges 75 are parallel and spaced with respect to each other. The spacing or distance between adjacent inwardly facing surfaces 76 is made slightly larger than the diameter of the rollers 77 of the conveyor chain 34. The manner in which each pair of adjacent inwardly facing surfaces 76 functions to guide the conveyor chain 34 during the operation of apparatus 10 will be explained in detail hereinafter.

Figure 7:
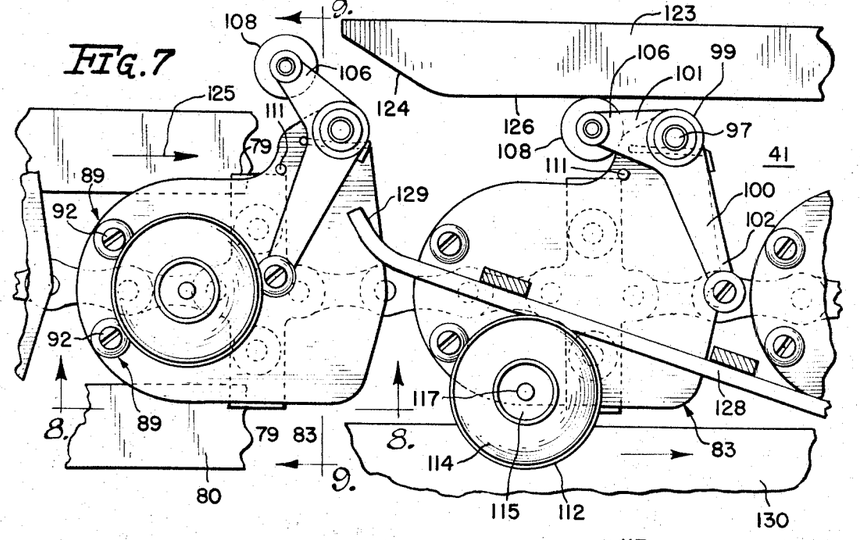
FIGURE 7 is an enlarged top plan view of the container-discharging area of the test tank, showing the means for disengaging the carriers from the containers and delivering the tested containers to a "take away" conveyor.
Figure 8:
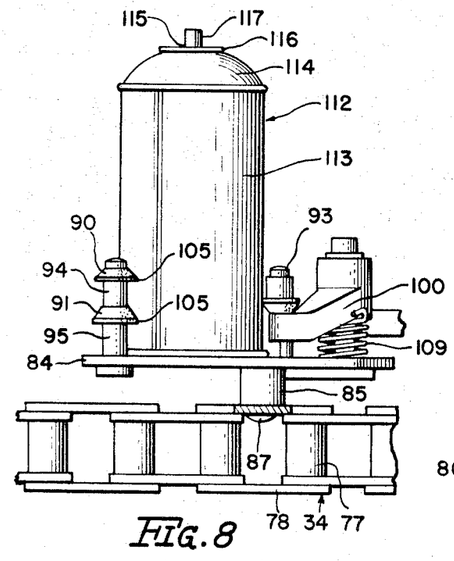
FIGURE 8 is a vertical sectional view taken substantially along line 8—8 of FIGURE 7 illustrating constructional details of the container carrier means.

Referring to FIGURES 7, 8 and 9, it will be noted that the conveyor chain 34 includes a plurality of rollers 77, each pair of adjacent rollers 77 being interconnected by means of a pair of link means. The link means interconnecting most of the rollers 77 of the conveyor chain 34 are in the form of short, plate-like links 78 and each link 78 has a size and shape not unlike the size and shape of a link found in a conventional roller type chain. However, certain of the links 78 are provided with integrally formed, oppositely extending, lateral extensions 79. Each lateral extension 79 projects transversely and horizontally, as best illustrated in FIGURES 7, 9 and 11, and each end portion thereof is engageable with a respective wear strip 80 for relative sliding movement. The wear strips 80 are suitably fastened to the webs 73 of the channel members 74 and are made of a material such as Teflon or the like for facilitating sliding movement between the lateral extensions 79 and the channel members 74. It will be noted that the links 78 provided with lateral extensions 79 are separated from each other by four conventional links 78. It will also be noted that when the end portions of the lateral extensions 79 are resting upon the wear strips 80, the inner flanges 75 of the channel members 74 are vertically spaced between the chain links 78 and the inwardly facing surfaces 76 of the flanges 75 are closely adjacent to the chain rollers 77. Thus, it will be appreciated that the inwardly facing surfaces 76 constitute the guide means of the track rails 59 to 64, inclusive, and serve to correctly guide and prevent lateral movement of the conveyor chain 34 as it traverses the track rails. It will also be appreciated that the conveyor chain 34 is properly supported for sliding movement and will not sag by virtue of the arrangement and construction of the lateral extensions 79 and the wear strips 80. It is to be understood that while every fourth link 78 is shown provided with lateral extensions 79, the actual number of links 78 separating such links could be greater or less than three without departing from the spirit and scope of the invention.

The track rail 65 is supported on the outriggers 66 and is secured thereto by means of a plurality of nut and bolt means 81 or similar fastening means. Each bolt of the nut and bolt means 81 extends through the horizontal leg 72 of a respective bracket member 70, a block-like spacer means 82 interposed between the associated outrigger 66 and the horizontal leg 72, and the outrigger 66. While not shown in detail, it is to be understood that the horizontal legs 72 of the bracket members 70 associated with the track rails 59–63, inclusive, are similarly secured to the bottom 20 of the test tank 15, and for the platform 54, and/or the extension 41.

A plurality of container carrier means are provided, each of which is designated generally by reference character 83. The container carrier means form a vital part of the container conveyor means 21 and each includes a plate-like container supporting disk 84 provided with a pair of laterally spaced, cylindrical bosses 85 depending from the underside thereof. Each boss 85 has a threaded recess formed therein. Each disk 84 is secured to a respective one of the chain links 78 provided with lateral extensions 79 by means of a pair of machine screws 87, adapted to extend through the lateral extensions and into threading engagement with the threads of the boss recesses thereof. It is to be understood that there is a disk 84 associated with each link 78 provided with lateral extension 79. The top surface 88 of each disk 84 is generally flat and, with the exception of a pair of container-engaging abutments 89 which extend normally therefrom, is relatively uncluttered. The longitudinal axes of the abutments 89 are laterally spaced on respective opposite sides of and an equal distance from a plane containing the longitudinal axes of the rollers 77 to which the associated link 78 having the lateral extension 79 is pivotally attached. This constructional arrangement is clearly illustrated in FIGURE 7. Each container-engaging abutment 89 includes an upper ring 90 and a lower ring 91. The rings 90 and 91 are identical in shape and construction, and are preferably made of rubber or other material having the same or similar physical characteristics of rubber. The rings 90, 91 are supported on the disk 84 by means of a bolt 92 which has its upper end defined by an enlarged head 93 and its lower end adapted to be threaded into a respective one of a pair of threaded recesses extending through the disk 84 and opening into the top surface 88 thereof. The rings 90 and 91 are maintained in a spaced relationship with each other by means of a cylindrical spacer 94 having a central bore through which the bolt 92 extends and the lower ring 90 is spaced from the top surface 88 of the disk 84 by means of a spacer 95, which is constructed in a manner similar to the construction of the spacer 94, interposed between the surface 88 and the lower ring 91. It will be apparent that the lengths of the spacers 94 and 95 may be varied to change or adjust the space relationship of the upper and lower rings 90, 91 and the space relationship of both rings 90, 91 and the top surface 88 of the disk 84. The purpose of making the abutments 89 adjustable will be appreciated hereinafter.

The disk 84 of each container carrier means 83 is provided with a lateral, thickened projection 96. The lower end of a pivot pin 97 is firmly connected to the projection 96 by employing any suitable means. The longitudinal axis of the pivot pin 97 is parallel to and spaced from the longitudinal axes of the abutments 89. The pivot pin 97 extends through the hub 98 of a lever 99 and supports the lever 99 for pivotal movement about the longitudinal axis of the pivot pin 97. As best shown in FIGURE 7, the lever 99 has a substantially L-shape when viewed in plan with the hub 98 being located at the juncture of arms 100 and 101 thereof. The terminal or free end 102 of the longest arm 100 is provided with an upstanding container abutment 103 which includes a cup-shaped ring 104 having the same construction and made of the same material as the rings 90, 91 described above. However, the ring 104 is arranged in such a fashion that the exposed annular flange 105 thereof is tapered downwardly whereas the comparable exposed flanges 106 of the rings 90, 91 are inclined upwardly. The free or terminal end 106 of the shortest arm 101 of the two arms 100, 101 is also provided with a stub shaft or pin 107 which depends from the underside thereof and serves as a means for rotatably supporting a metal roller 108. A helically-wound torsion spring 109 encircles the pivot pin 97 and is sandwiched between the hub 98 and the disk projection 96. One end of the spring 109 is confined in an aperture formed in the top surface of the disk projection 96 and opposite end of the spring 109 bears against one side of the arm 100. From the foregoing, it will be appreciated that the lever 99 is resiliently urged in a clockwise direction, as viewed in FIGURE 7, by the spring 109. Thus, the spring 109 yieldably urges the abutment 103 toward the fixed abutments 89. Clockwise movement of the lever 99 is limited by means of an upright pin 111 which is pressed into or otherwise secured to the disk. The pin 111 is in the path of movement of the arm 100 and is adapted to engage the side thereof opposite the side upon which the torsion spring 109 reacts after the lever 99 has pivoted a predetermined amount in clockwise direction.

The apparatus 10 is suited to handle a variety of containers or receptacles of different sizes, shapes and materials and, as stated hereinbefore, the term "container" as used herein shall include cans, bottles and other vessels made of any kind of material whether magnetic or not. However, the apparatus 10 has particular utility in the manufacturing and processing of containers containing a product which is dispensed from the container by means of a propellent also contained within the receptacle. The container 112 usually includes a cylindrical body 113 which is generally made of metal. The metal oftentimes is the conventional material known as tin plate and body 113 is therefore magnetic. However, oftentimes the body 113 is formed from non-magnetic aluminum, or some non-magnetic metallic or non-metallic material. The container body 113 is closed at its bottom end and has an upper neck portion 114 provided with a central circular filling opening which is defined by an outwardly-rolled annular bead, the outer surface of which serves as a seat for a closure cap 115 which is generally preformed with a cup-shaped bottom portion partially defined by a cylindrical wall and with a peripheral flange 116 extending radially outwardly from the normally upper end of the cylindrical wall. The flange 116 has a substantially semi-circular cross section and is adapted to engage and overlie the annular bead. The lower portion of the cylindrical wall of the closure cap 115 is expanded radially outwardly into sealing relation with the can body 113 to secure the closure cap 115 to the can body 113. A suitable gasket (not shown) carried by the flange 116 is compressed between the wall of the bead and the flange 116, during the closure cap securing operation. The closure cap 115 is fitted with central valve device 117 for controlling the discharge of the pressure-propelled product from the container 112.

As readily apparent from the drawings, each container carrier means 83 is adapted to support a container 112 for movement both above and below the level 27 of the water contained in the test tank 15. Inasmuch as the sealed containers 112 are made of relatively light-weight material and is partially filled with a pressure propellent which is in the form of a gas under normal room temperatures, the buoyancy force acting on the immersed containers 112 is greater than the force of gravity and, consequently, the resultant force tends to urge the containers 112 to the surface 27 of the water. This resultant force acting on each container 112 is counteracted by the frictional gripping or clamping action afforded by the fixed abutments 89 and the movable abutment 103 acting on the container 112. As best shown in FIGURES 7, 8 and 9, when a container 112 is being supported by the disk 84, the bottom end of the container body 113 rests upon the top surface 88 of the disk 84 and the flanges 105 of the fixed abutment rings 90, 91 and the movable abutment ring 104 is firmly pressed into frictional engagement at three circumferentially spaced places or surface areas with the container body 113 by the resilient action of the torsion spring 109. It will be appreciated that the magnitude of the force each torsion spring 109 is capable of exerting on a gripped container 112 is sufficient to prevent the buoyancy force from dislodging the container 112 from the container-supporting disk 84 when submerged in the test tank water. It will also be noted that the fixed abutments 90, 91 properly center or position the container 112 on the disk 84 so that the longitudinal axis of the container 112 lies in a plane spaced substantially mid way between the longitudinal axes of the fixed abutments 90, 91 and containing the longitudinal axes of the chain rollers 77 to which the lateral extensions 79 of the link 78 associated with the particular disk 84 are attached. Furthermore, since the abutment 103 is capable of moving toward and away from the fixed abutments 90, 91 a considerable amount, the container carrier means 83 can handle containers having bodies of various diameter sizes which may be larger or smaller than the diameter size of the container body 113 illustrated in FIGURE 7. It will also be appreciated that the spacers 94, 95 of the fixed abutments 90, 91 and the spacer 118 carried by the movable abutment 103 may be readily replaced with spacers having lengths different from the lengths of the spacers illustrated so that container bodies of heights different from that shown may be efficiently accommodated by the container carrier means 83.

As was pointed out hereinbefore, when the container carrier means 83 is not supporting a container 113 on its disk 84, the lever arm 100 is in abutting engagement with the stop pin 111. This condition of the lever 99 and the movable abutment 103 is illustrated in FIGURE 5. In order to move the abutment 103 away from the fixed abutments 90, 91 to its fullest extent so as to condition the container carrier means 83 for the reception of a container 112 and to thereafter permit the torsion spring 109 to effect clamping engagement of the abutment rings 90, 91 and 104 with the container body 113, an elongated cam bar 119 is provided. As illustrated in FIGURE 5, when the empty container carrier means 38 commences to traverse the track rail 55 at the free end of the relatively long section 56 and the levers 99 are in their closed positions, the rollers 108 are laterally spaced from the right hand channel member 74 a maximum distance. The cam bar 119 is positioned closely adjacent to and along the side of the end portion of the relatively long straight section 56 adjacent the curved section 58 and at a height corresponding to the height of the rollers 108 above the platform 54. Consequently, as each empty container carrier means 83 proceeds down the track rail section 56 and approaches the curved section 58, the roller 108 engages an edge surface 120 of the cam bar 119 which serves as a ramp or cam surface for moving each lever 99 to its fully opened position during such movement of the carrier means 83. The cam surface 120 merges into a relatively long cam surface which lies in a vertical plane parallel to a vertical plane containing the median line of the track rail section 56. The cam surface 121 constitutes that surface of the cam bar 119 which is spaced the closest to the track rail section 56. It will be appreciated, that as each roller 108 engages the end of the cam surface 120 remote from the end thereof merging with the cam surface 121 and the container carrier means 83 associated therewith is moved toward the curved track rail section 58, the lever 99 is rocked against the resilient action of the torsion spring 109 to its fully opened position. The lever 99 remains in its fully opened position as the container carrier means 83 proceeds along the track rail section 56 since the roller is in engagement with the cam surface 121. However, as the container carrier means 83 enters the curved track rail section 58, the roller 108 commences to traverse a ramp or cam surface 122 which is similar to but is inclined or tapered in a reverse direction from the cam surface 120. In other words, the cam surface 122 diverges away from the track rail 55 in the direction of conveyor travel. Thus, as the container carrier means 83 leaves the track rail section 56 and enters the curved track rail section 58, the roller 108 moves down the ramp or cam surface 123 to permit the torsion spring 109 to move the lever 99 to its closed position. It is to be understood that when the apparatus 10 is in operation, a container 112 is positioned on the disk 84 during the interval of time the roller 108 is riding over the cam surface 121 by the container feeding means 22 which will be described hereinafter, so that when the lever 99 is permitted to pivot to its fully closed position as the roller 108 traverses the cam surface 122, it does not actually move to its fully closed position but rather moves into clamping or gripping relation with the container 112 received on the disk 84.

The cam means cooperable with the rollers 108 of the container carrier means 83 for releasing or unclamping the containers 112 after they have been tested for leakage so as to be in condition for removal from the supporting disks 84 and transported away from the apparatus 10 by the container discharge means 23, which will be described hereinafter, is similar to the cam means described above. The cam means at the container discharge area of the apparatus 10 includes an elongated cam bar 123 which is mounted on the top surface 65 of the extention 41 adjacent the end portion of the horizontal track rail section 68 of the track rail 63. The cam bar 23 is provided with a ramp or cam surface 124 which is engaged by the rollers 108 of the container carrier means 83 as they approach the discharge end of the track rail 63. Referring to FIGURE 7, it will be clear that as each container carrier means 83, continues to move in the direction of the arrow 125, after the roller 108 thereof engages the cam surface 124, the abutment 103 carried by the lever 99 commences to move out of clamping engagement with the container body 113. When the container carrier means 83 has proceeded to a point where the roller 108 reaches the end of the cam surface 124, the lever 99 is then in its fully operated position and the container 112 is released from the disk 84. The cam bar 123 is provided with a cam surface 126 which is similar to form and function to the cam surface 121 of the cam bar 119. During the time that the roller 108 of each container carrier means 83 traverses the cam surface 126, the lever 99 associated therewith is maintained in its fully opened position. The cam bar 123, like the cam bar 119, is also provided with a cam surface 127 for engagement with the rollers 108 whereby the torsion springs 109 are permitted to move the levers 99 to their fully closed position.

The container discharge means 23 for removing the containers 112 from the support disks 84 after the containers 112 have been subjected to the leakage test includes an upright fence or barrier 128 which is supported on the extension 41 and which is angularly oriented with respect to line of travel of the container carrier means 83 at the end of the track rail section 68 of the track rail 63. As shown in FIGURE 7, the fence 128 is disposed in the path taken by containers 112 and the end 129 of the fence 128 first engaged by the containers 112 is disposed in such a manner with the cam surface 124 of the cam bar 123 that each container 112 is completely released from its respective support disk 84 when the container 112 engages such fence end 129. Consequently, because of the angular arrangement of the fence 128 continued movement of the container carrier means 83 in the direction of the arrow 125 causes the released containers 112 supported on disk 84 thereof to move along the fence 128 and be guided laterally off the disk 84 onto the upper flight 130 of a conventional plate-type conveyor 131 partially shown in FIGURES 1 and 7, which is flush or in horizontal alignment with the top surfaces 88 of the disks 84 in his area. The conveyor 131, which per se forms no part of the present invention transports the tested containers 112 to another machine or work station for further processing.

The power means 25 for driving the container conveyor means 21 and the container feeding means 22 includes an electric motor 132 which is mounted on the framework 11 below the platform 54, as illustrated in FIGURE 2. A belt 133 is trained over a pulley wheel 134 fixed to the motor shaft 135 and a pulley wheel 134 fixed to the motor shaft 135 and a pulley wheel 136 keyed to the input shaft 137 of a speed reducer unit 138. Vertical shaft 38 to which sprocket wheel 35 is keyed constitutes one of the two output shafts of the speed reducer unit. From the foregoing, it will be appreciated that when the motor is in operation, the container conveyor means 21 will move through the test tank 15 in the manner pointed out hereinafter. The sprocket wheel 35 can be considered the main drive sprocket wheel. Auxiliary drive means for the conveyor means 21, while generally not necessary, may also be incorporated in the apparatus 10 to insure proper operation of the conveyor means. The auxiliary drive means includes a pair of meshing gears 139 and 140, keyed respectively to shaft 37 and a vertical shaft 141 suitably supported by the framework 11. The uppermost end of the shaft 141 has a sprocket wheel 142 fixed thereto which is disposed above the platform 54, as illustrated in FIGURE 1. Suitably keyed to the uppermost ends of the shafts 47 and 48 are sprocket wheels 143 and 144, respectively. An endless sprocket chain 145 is trained over the sprocket wheels 142, 143, and 144. Thus, it will be appreciated that driving power is applied to the conveyor chain 34 by means of the sprocket wheels 43 and 44 as well as by means of the main drive sprocket wheel 35.

The container feeding means 22 for delivering containers 112 to be tested for leakage to the container conveyor means 21 includes a plate-type conveyor 146 for receiving containers 112 to be tested and transporting the containers 112 along a guideway, designated generally by reference character 147, to a rotating turret 148, which turret 148 functions to continually position a container 112 on each of the supporting disks 84 of the container carrier means 83 when the container carrier means 83 is at the curved track rail section 58 of the track rail 55 wherein it is in condition to receive a container 112, as pointed out above. The container feeding means 22 also includes a horizontally extending screw-type auger 149 for providing a predetermined space between adjacent containers 112 as they are moved along the guideway 147 by the conveyor 146. Proper spacing of the container 112 is necessary to insure proper and efficient operative engagement thereof by the turret 148.

The infeed conveyor 146 is constructed in a conventional manner and includes a plurality of pivotally interconnected plates which form an endless belt which is trained about a drive gear 150 and an idler gear (not shown). The drive gear 150 is keyed to a horizontally extending shaft 151 to which a sprocket wheel 152 is also secured. A shaft 153, suitably supported by the framework 11 so as to be spaced and parallel with respect to the shaft 151, has a sprocket wheel 154 fixed thereto which is drivingly connected to the sprocket wheel 152 by means of a sprocket chain 155. In addition to the sprocket wheel 154, the shaft 153 also has a sprocket wheel 156 and a sprocket wheel 157 keyed thereto. Sprocket wheel 156 is drivingly connected to a sprocket wheel 158 keyed to one end of a shaft 159, spaced and parallel to the shaft 153, by means of an endless sprocket chain 160. A relatively large sprocket wheel 161 is also fixed to the shaft 159 and has a sprocket chain 162 trained over it. The sprocket chain 162 is also trained over a sprocket wheel 163 keyed to one end of an output shaft 164 of the speed reducer unit 138. From the foregoing, it will be appreciated that when the motor 132 is operating the infeed conveyor 146 is also operating and when containers 112 are delivered to the end of the top flight thereof spaced furthest from the end wall 16 of the test tank 15, the containers 112 are supported in an upright position and transported toward the turret 148.

The screw-type auger 149, which extends along one side of the upper flight of the conveyor 146, has one end provided with a drive sprocket wheel 165. The sprocket wheel 165 is rotated by means of a sprocket chain 166 driven by a sprocket wheel 167 keyed to the output shaft 168 of a right angle gear unit 169. The input shaft 170 of the right angle gear unit 169 has a sprocket wheel 171 fixed thereto. An endless sprocket chain 172 is trained over the sprocket wheels 157 and 171. It will be appreciated that the power transmission mechanism described is effective to cause rotation of the auger 149 whenever the motor 132 is energized. Each container 112 upon reaching the end of the auger 149 remote from the end wall 16 is engaged by the screw thread of auger 149. It is to be understood that the auger 149 is rotated in the direction which assists the conveyor 146 in moving the containers 112 toward the turret 148. The auger 149 functions in a conventional manner and, consequently, as the containers 112 move toward the turret 148, adjacent containers 112 are spaced with respect to each other a distance equivalent to the pitch of the auger screw thread.

As best shown in FIGURES 1 and 5, the guideway 147 for maintaining the containers 112 on the conveyor 146 and for directing them to the turret 148 comprises an upright fence 173 which is disposed on the opposite side of the conveyor 146 from the auger 149 and is in lateral alignment with and has substantially the same length as the auger 149. The containers 112 engage and slide along the fence 173 when the apparatus 10 is in operation. Although not shown means are provided for adjusting mounting means of the guide fence 173 so the lateral spacing between the guide fence 173 and the auger 149 may be varied. Thus, infeed guideway 147 may be adjusted to accommodate containers having diameters smaller or larger than the diameter of the containers 112 shown in the drawings.

The turret 148 comprises a pair of vertically spaced and parallel star wheels 174. Each star wheel 174 is provided with a plurality of circumferentially spaced, radially extending arms 175. The lowermost star wheel 174 is keyed to a vertical shaft 176. The uppermost star wheel 174 is drivingly connected to the lowermost star wheel 174 by suitable means and is oriented with respect to the lowermost star wheel 174 that each arm 175 of one star wheel is in vertical alignment with an arm 175 of the other star wheel 174. It is to be understood that the vertical spacing between the star wheels 174 may be varied by interposing spacing means of various thicknesses between the star wheels 174. Thus, the turret 148 may be adjusted to handle containers having heights greater and smaller than the height of the containers 112. The shaft 176 to which the turret 148 is drivingly connected constitutes the output shaft of a miter gear unit 177. The input shaft 178 of the miter gear unit 177 has a sprocket wheel 179 keyed thereto over which an endless sprocket chain 180 is trained. The sprocket chain 180 is trained over a sprocket wheel 86 so as to be driven thereby. From the foregoing, it will be appreciated that the turret rotates in a clockwise direction, as viewed in FIGURE 5, when the motor 132 is operating.

Referring to FIGURE 5, it will be noted that as the turret 148 rotates the turret arms 175 sweep over the innermost end of the conveyor 146. Thus, as each pair of vertically aligned arms 175 commences to extend over the innermost end of the conveyor 146, it will engage the body 113 of the container 112 delivered thereby the conveyor 146. Inasmuch as the turret 148 is continually rotating when the apparatus 10 is in operation, once the container body 113 is engaged by the turret arms 175, it will be forced to slide in an arcuate path partially defined by a curved fence 181. The radius of curvature of the curved fence 181 intersects and is normal to the rotational axis of the turret 148, and, as shown in FIGURE 5, the fence 181 extends from approximately the innermost ends of the auger 149 and conveyor 146 to an area near the juncture of the curved track rail section 58 and the track rail section 57. The fence 181 is positioned radially with respect to the turret 148 throughout its length in such a manner that the containers 112 are maintained in operative engagement with the turret arms 175 as they move from one end of the fence 181 to the other end. As clearly illustrated in FIGURE 5, the curved path taken by the containers 112, one edge of which is partially defined by the fence 181, merges with the path taken by the container carrier means 83 in an area near the juncture of the track rail section 56 and the curved track section 58. As stated hereinbefore, as each empty container carrier means 83 proceeds down the track rail section 56 and approaches the curved section 58, or the area where the curved path taken by the incoming containers 112 merges or intersects the track rail 55, the roller 108 thereof engages the cam surface 120 of the cam bar 119 and the lever 99 of the container carrier means 83 is moved to its fully opened position. The movement of the conveyor means 21 through the track rail 55 and the speed of travel thereof is synchronized with the movement of the turret arms 175 and the rotational speed of the turret 148 in such a fashion that as each container 112 is moved to the area near the juncture of the track rail section 56 and the curved track section 58, an empty, fully opened container carrier means 83 will also be in the same area with the disk 84 in vertical alignment with the container 112. Thus, as each container carrier means 83 passes through the aforementioned area near the juncture of the track rail sections 56 and 58, a container 112 is positioned on the top surface 88 of the disk 84 thereof. Once the container 112 is placed on the top surface 88 of the disk 84 by the turret 148, the turret 148, container 112 and container carrier means 83 move in unison for a short distance. As the container carrier means 83 enters the curved track rail section, the cam follower roller 108 thereof commences to traverse the cam surface 122 and, consequently, the lever 99 is moved to its clamping position. By the time the container carrier means 83 enters the track rail section 57, the container body 113 is firmly gripped between the fixed abutments 89 and the movable abutment 103 and as the container 112 is moved further along the track rail section 57 it is progressively moved out of engagement with the particular pair of turret arms 175 which positioned the container 112 on the container carrier means 83.

The water heating and circulating means 24 includes a motor driven pump 182 which has its suction side in fluid communication with a return opening in and near the center of the bottom 20 of the test tank 15. The discharge side of the pump 182 is in fluid communication with a pair of identical filtering units 183, each of which, in turn, can be selectively placed in fluid communication with the inlet side of a heat exchanger 184. The heat exchanger 184 is preferably of the type that utilizes low pressure steam to heat the water passing therethrough. The temperature of the water flowing from the heat exchanger 184 is thermostatically controlled and is usually maintained at a particular temperature within the range of 110° to 170° Fahrenheit. The heater water flowing from the heat exchanger 184 enters the bottom of the test tank 15 at respective opposite ends thereof. Thus, it will be appreciated that the water is continually circulated through the test tank 15 and maintained at a particularly desired temperature deemed necessary to elevate the temperature of the contents of the containers 112 to a particular value corresponding to desired internal test pressure desired to be developed in the containers 112 during the interval of time the containers 112 are traversing the test tank 15 below the level 26 of the water. The level 26 of the water is maintained constant by a pair of standpipes or overflow pipes 185. The overflow pipes 185 are longitudinally spaced from each other and are in fluid communication with a drain line (not shown). The level 26 of the water is prevented from rising above the uppermost open ends of the overflow pipes 185. The lengths of the overflow pipes 185 are preferably made telescopically adjustable so as to permit varying the distance the level 27 of the water is above the bottom 20 of the test tank 15. The water level 27 is usually adjusted and maintained at a height which is approximately a couple of inches above the containers 112 when the containers 112 are traversing the track rails 60, 61 and 62. The overflow pipes 185 also serve as skimming means for removing any contaminants or scum present on the surface of the water that would hamper sighting of leakage bubbles by the operator.

Oftentimes, because of the contents of the containers 112 being tested, leakage of a container 112 causes the water to become cloudy or contaminated to such an extent that leakage bubbles can not be seen. If the container product has a specific gravity smaller than unity and is not soluble in water it will float to the surface and appear as scum. If such is the case, the pump 182 is speeded up slightly to raise the level of the water above the inlet openings of the overflow pipes 185. Consequently when this is done the scum or product leaked from the defective container 112 will flow into the overflow pipes 185 and thus the water will be rendered clear again. The filtering units 183 are provided to rid the water of the product leaked from defective containers 112 if the container content is soluble in water and/or does not float to the surface of the water. The contaminated water is directed to either one of the filtering units 183 after flowing through the regular return opening in the bottom 20 of the test tank 15 in order to remove the contaminant and render the water in the test tank 15 clear once again. While two filtering units 183 are shown only one is used at a time in the water circulating system, the unused one being cleaned or standing by for emergency use.

It is obvious that after the containers 112 have been immersed in the water of the tank 15 the outer surfaces thereof are wet. Furthermore, because of the cup-shaped configuration of the usual closure cap 115 used in conventional aerosol dispensers or bombs and because the containers 112 traverse the test tank 15 in a generally upright position, a small amount of water is oftentimes carried out of the test tank 15 by the closure caps 115 of the containers 112. Inasmuch as the containers 112 are usually directed to another work station immediately after being tested for leakage, it is desirable to have the containers 112 dry or substantially dry before reaching the next work station. Thus, to remove the excess water accumulated on or carried by the containers 112, the container drying means 26 of the embodiment of the invention illustrated in FIGURE 1 includes a three sided enclosure 186 which has a generally rectangular shape in plan as well as in side elevation. The enclosure 186 has its bottom and longitudinal ends open and is mounted at the intersection of the end wall 17 and the side wall 19. The enclosure 186 extends above the marginal edge 42 of the test tank 15 and the roof 187 thereof overlies the inclined track rail section 69 of the track rail 63. From the foregoing, it will be apparent that as the containers 112 move along the inclined track rail section 69 and approach the track rail section 68 they are removed from the water. It will also be noted that the longitudinal axes of the containers 112 are inclined and not vertically disposed during such upward travel. An air manifold 188 is mounted in the inclosure 186 and has its longitudinal axis extending generally parallel to the plane of the inclined track rail section 169. Compressed air is supplied to the manifold 188 by means of a pipe 189. Compressed air is emitted from the manifold 188 through a plurality of nozzles 190 spaced along its length and because of the aforesaid relative disposition of the nozzles 190 and the inclined track rail section 69, the containers 112 and particularly the areas of the closure caps 115 thereof are subjected to the compressed air streams flowing from the nozzles 190. Thus, excess water is blown from the containers 112 and the compressed air streams tend to air dry the containers 112 before they are removed from the conveyor means 21 by the discharge means 23.

Figure 10:
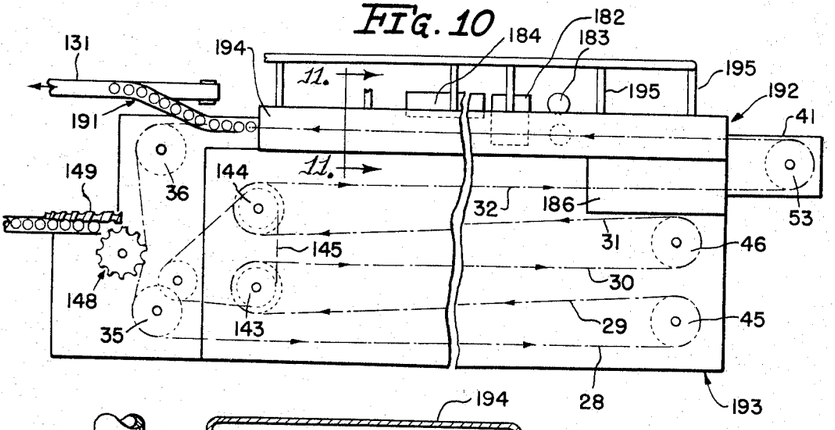
FIGURE 10 is a plan view of a modified embodiment of the invention wherein a container-drying tunnel is incorporated in the testing apparatus.

The embodiment of the invention illustrated in FIGURES 10 and 11 is similar in all structural and functional respects as apparatus 10 described hereinbefore with the exception of the location of the container discharge means 191 and a more elaborate container drying means, designated generally by reference character 192, is provided. The discharge means 191 utilized in the modified apparatus 193 is structurally and functionally the same as the discharge means 23 described hereinbefore with reference to the apparatus 10. However, the discharge means 191 is located at the end of the track rail 64 adjacent the sprocket wheel 36. Thus, it will be appreciated that instead of the container carrier means 83 traversing the track rail 64 in an empty condition as in the operation of the apparatus 10, each carrier means 83 is supporting a container 112. A longitudinal tunnel, designated generally by reference character 194, extends substantially the length of the track rail 64, as shown in FIGURE 10. Thus, the containers 112 moving along the track rail 64 pass through and are substantially enclosed by the tunnel 194. When the apparatus 193 is in operation heated air is introduced into the tunnel 194 through a series of air ducts 195. From the foregoing, it will be appreciated that the heated air completely dries the containers 112 before they emerge from the end of the tunnel 194 closest to the discharge means 191.

It is believed the operation of both the apparatus 10 and the modified form of apparatus 193 is apparent from a reading of the foregoing description. Both apparatuses 10 and 193 are capable of operating continuously for testing sealed containers 112 for leakage which is visually indicated by bubbles in the test bath water. The operation of the leakage testing apparatuses 10 and 193 is substantially automatic since the containers 112 are fed to the conveyor means 21 by the container feeding means 22 for movement below the level of the test tank water maintained at a predetermined selected temperature and are removed from the conveyor means 21 by the discharge means 23 at the completion of the test without the need of any manual assistance. Thus, the test apparatuses 10 and 193 are capable of being associated with other automatic machines utilized in the manufacture and processing of sealed containers 112 of the type charged with a pressure propellent whereby the containers 112 can be easily mass produced and processed.

Furthermore, the apparatuses 10 and 193 are extremely versatile and adaptable to handle containers 112 of a variety of different heights and diameters without extensive modification of the various components thereof. It will also be appreciated that because of the novel container carried means 83 employed, containers 112 made of any kind of material, such as steel, glass, aluminum, etc., whether such materials are magnetic or not, can be handled by the apparatuses 10 and 193.

The embodiments of the invention chosen for the purposes of illustration and description herein are those preferred for achieving the objects of the invention and developing the utility thereof in the most desirable manner, due regard being had to existing factors of economy, simplicity of design and construction, production methods, and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. An apparatus for testing generally cylindrical containers for leakage, comprising, a liquid-filled tank having an open top; conveyor means for supporting the containers and carrying them above and below the surface of the liquid in said tank, said conveyor means including an endless chain means having certain runs thereof disposed entirely above the level of the liquid in said tank, and a plurality of carrier means connected to said endless chain means at spaced points along the length thereof, each of said carrier means including a substantially flat plate-like disk, each of said disks being capable of supporting a container thereof in an upright position whereby the longitudinal axis thereof is substantially normal to the flat disk, each of said carrier means including releasable clamping means operable to frictionally grip a container and resist displacement thereof with respect to a respective flat disk, each of said releasable clamping means of each of said carrier means including a pair of spaced abutment means carried by and fixed with respect to the flat disk thereof, said fixed abutment means being frictionally engageable with the outer surface of the cylindrical container supported on said flat disk at circumferentially spaced points, each of said clamping means further including a lever having an intermediate portion pivotally connected to the flat disk, abutment means carried by one end of said lever whereby said abutment means is movable toward and away from a first plane containing the longitudinal axis of the container and parallel to a second plane containing said fixed abutment means, said movable abutment means being movable upon pivoting of said lever into frictional engagement with a container supported on said flat disk at a point spaced from and disposed on an opposite side of said first plane from said second plane, and each of said clamping means further including biasing means for pivoting said lever in one direction and for yieldably urging said movable abutment means toward said first plane; and discharge means for removing containers from said conveyor along one of said runs of said endless chain means disposed entirely above the level of the liquid in said tank including a cam follower carried by the end of each of said levers opposite the end carrying the abutment means and a cam fixedly positioned along said one run of said endless chain means and engageable by said cam followers as the carrier means move along said one run, said cam being effective to pivot said levers against the resilient action of said biasing means and move said movable abutment means away from said first plane as the carrier means move along said one run biasing means being effective to pivot said levers in a direction to cause said movable abutment means to move toward said first plane upon movement of said cam followers out of engagement with said cam by said endless chain means near one end of said one run.

2. An apparatus for testing generally cylindrical containers for leakage as set forth in claim 1, including container feeding means for delivering containers seriatim to said carrier means, said container feeding means being effective to position a container on the flat disk of a carrier means as it moves along a second run of said endless chain disposed entirely above the level of the liquid in said tank.

3. An apparatus for testing generally cylindrical containers for leakage as set forth in claim 2, wherein said container feeding means for delivering containers seriatim to said carrier means includes a rotatable turret having a plurality of generally radially extending, circumferentially spaced arms, each of said arms partially defining a pocket for receiving a container, the container disposed in said pockets travelling in a curved path when said turret is being rotated, said curved path merging with second run of said endless chain means, and said container feeding means including container guide means disposed adjacent the merger of said curved path and said second run of said endless chain means operatively engageable with the containers as they move in said arcuate path for removing them from engagement with said turret arms and transferring them to said carrier means as said carrier means are traversing said second run of said endless chain means and before said biasing means of said carrier means are effective to pivot the levers in a direction to cause the movable abutment means to move toward said first plane.

4. An apparatus for testing generally cylindrical containers for leakage as set forth in claim 3, including a single power means drivingly connected to said turret and said endless chain means for driving said turret and endless chain means in unison.

5. An apparatus for testing generally cylindrical containers for leakage as set forth in claim 4, wherein said container feeding means includes means for delivering a container to each pocket of said turret and said turret rotates comprising a rotatable feed auger, the rotational axis of which merges with said curved path, said container feed means further including a plate-type conveyor means for supporting and transporting containers to said turret, said feed auger spacing adjacent containers a predetermined distance apart as they are transported to said turret by said plate-type conveyor means.

6. An apparatus for testing generally cylindrical containers for leakage as set forth in claim 5, wherein said single power means is also drivingly connected to said feed auger and said plate-type conveyor means for driving the same.

References Cited

UNITED STATES PATENTS

| | | | |
|---|---|---|---|
| 369,539 | 9/1887 | Mann | 73—41.2 |
| 683,679 | 10/1901 | Case | 73—41.3 |
| 1,433,284 | 10/1922 | Johnson et al. | 73—41.2 |
| 1,864,064 | 2/1930 | Hall | 134—73 |
| 1,871,339 | 8/1932 | Pearson | 134—73 |
| 2,339,960 | 1/1944 | Cozzoli | 73—52 |

LOUIS R. PRICE, *Primary Examiner.*

W. A. HENRY, *Assistant Examiner.*